United States Patent [19]

Oberkirch et al.

[11] 3,719,652

[45] March 6, 1973

[54] POLYMERIZATION OF CYCLOPENTENE

[75] Inventors: Wolfgang Oberkirch; Gottfried Pampus; Peter Gunther, Leverkusen, Germany

[73] Assignee: Bayer Aktiengesellschaft, Leverkusen, Germany

[22] Filed: May 5, 1971

[21] Appl. No.: 140,582

Related U.S. Application Data

[63] Continuation of Ser. No. 833,669, June 16, 1969, abandoned.

[30] Foreign Application Priority Data

June 21, 1968 Germany..................P 17 70 688.6

[52] U.S. Cl. ............260/93.1, 252/429 R, 252/431 R
[51] Int. Cl..................................................C08f 1/56
[58] Field of Search ..............260/93.1; 252/429, 431

[56] References Cited

UNITED STATES PATENTS

| | | | |
|---|---|---|---|
| 3,281,375 | 10/1966 | Vandenberg | 252/429 |
| 3,380,981 | 4/1968 | Miller et al. | 260/93.7 |
| 3,492,278 | 1/1970 | Uraneck et al. | 260/93.1 |

*Primary Examiner*—James A. Stidleck
*Assistant Examiner*—Stanford M. Levin
*Attorney*—Connolly & Hutz

[57] ABSTRACT

Process for producing cyclopentene polymers which comprises contacting cyclopentene at a temperature of from −60° to +60°C with a catalyst comprising
  a tantalum compound (I)
  a halogen compound (II)
  an organo-aluminum compound (III)
the components being in a molar ratio of I : II : III = 1 : 0.3–10 : 0.5–15.

10 Claims, No Drawings

POLYMERIZATION OF CYCLOPENTENE

CROSS-REFERENCE TO RELATED APPLICATION

This application is a continuation of application Ser. No. 833,669 filed June 16, 1969 and now abandoned.

Object of this invention is a process for polymerizing cyclopentene and a catalyst to carry out this process.

The process of this invention uses a catalyst comprising a tantalum compound (I)
a halogen compound (II) and
an organo-aluminum compound (III).

The process is effected generally speaking by contacting a solution of cyclopentene in an inert organic solvent with said catalyst.

Particularly suitable tantalum compounds include the halides and oxyhalides of tantalum such as $TaCl_5$, $TaCl_4$, $TaCl_3$, $TaCl_2$, $TaOCl_3$, $TaBr_5$, $TaOBr_3$ and $TaI_5$.

However, it is also possible to use the salts of tantalum with strong mineral acids, aliphatic and aromatic carboxylic acids, and its alcoholates and $\beta$-keto-enolates, for example, tantalum ethylate and tantalum acetyl acetonates.

Preferred halogen compounds include those which show a cocatalytic activity in their Friedel-Crafts reactions [cf. for example, C.A. Thomas "Anhydrous Aluminum Chloride Organic Chemistry", New York (1941), pages 24, 101, 121, 201 and 596].

Of these compounds, the following are particularly suitable Allyl halides such as allyl chloride; 3-chlorocyclopentene benzyl chloride; tert.-alkyl halides such as tert.-butylchloride and tert.-amylchloride; $\alpha$-halogen ketones such as $\alpha$-chloroacetone and $\alpha$-bromo acetone; $\alpha$-halogen alcohols such as $\alpha$-chloroethanol, 1,3-dichloro-2-propanol, $\alpha$-chlorocyclohexanol and $\alpha$-chlorophenol; cyclic and linear $\alpha$-halogen ethers such as epichlorhydrin, epibromhydrin and $\alpha$-chlorodiethylether; hydrohalic acids such as hydrogen chloride and hydrogen bromide which are preferably prepared in situ from tantalum halides and water, and salts of hydrohalic acids such as ferric chloride or cupric chloride. (Halogen means preferably chlorine, but also iodine and bromine.)

Suitable organo-aluminum compounds include aluminum trialkyls (preferably with one to six carbon atoms in the alkyl group) such as triethyl aluminum, dialkyl aluminum halides such as diethyl aluminum chloride, and alkyl aluminum sesquihalides. Alkyl aluminum dihalides (alkyl, preferably alkyl having one to six carbon atoms, halide meaning preferably chloride, bromide and iodide) such as ethyl or isobutyl aluminum dichloride, are particularly preferred.

The ratio in which the catalyst components are used may be varied within wide limits. It is preferred to operate with a molar ratio of I : II : III = 1 : 0.30–10 : 0.5–15.

Polymerization may be carried out with or without a solvent. Suitable solvents include hydrocarbons such as hexane, heptane, benzene, toluene and, preferably, halogenated hydrocarbons such as chlorobenzene or chloroform.

The catalysts may be prepared and polymerization carried out at temperatures of from −60°C. to 60°C., and preferably at temperatures of from −30°C. to 10°C.

The process is preferably carried out by adding initially the monomer and then the halogen compound and finally the organo-aluminum component to a solution of the tantalum compound in one of the aforementioned solvents. The catalyst is preferably used in a quantity of from about 0.1 to 5 percent, and preferably from 0.5 to 3 percent, based on the weight of the monomer. Polymerization may be carried out over periods ranging from 15 minutes to 5 hours. The conversions obtained vary from 70 to 90 percent and above. The polymers are isolated as known per se by precipitation with alcohol or by removing volatile components with steam, and are optionally stabilized in known manner.

The resulting polymers are elastomeric products which can be vulcanized and processed by known processes. Usually from 80 to 95 percent of the double bonds present are in trans-configuration.

EXAMPLE 1

Three hundred and forty mg. of tantalum-(V)-chloride are dissolved in 50 ml. of chlorobenzene, 25 ml. of cyclopentene being added to the resulting solution which is then cooled to −30°C. This is followed by the addition of 0.15 ml. of 3-chlorocyclopentene. The product is reduced with 2.4 ml. of a 50 percent solution of ethyl aluminum dichloride in hexane. The mixture is stirred for 2 hours at from −10°C. to −15°C.

Polymerization is stopped with a mixture of 20 ml. of benzene, 6 ml. of isopropanol, 4 ml. of N-dimethyl ethanolamine and 0.3 g. of 2,2'-dihydroxy-3,3'-ditert.-butyl-5,5'-dimethyl-diphenylmethane.

The polymer is precipitated with approximately 1 liter of methanol and dried in vacuo at 50°C. Yield : 12 g. (65 percent). Trans-double bond content : 86 percent.

EXAMPLE 2

720 mg. of tantalum-(V)-chloride are dissolved in 50 ml. of chlorobenzene, 50 g. of cyclopentene being added to the resulting solution. 2 ml. of a 1M-$\alpha$-chloroacetone solution in chlorobenzene are then added, and the reaction mixture is cooled to −20°C. and then reduced with 2.46 ml. of a 50 percent solution of ethyl aluminum dichloride in hexane. After 5 hours polymerization at −20°C., the polymer is worked up as described in Example 1. Yield : 35 g (70%). Trans-double bond content : 71 percent.

EXAMPLE 3

The procedure is as in Example 2, except that a 1M solution of ethyl aluminum sesquichloride in hexane is used as the reducing agent in a quantity of 6 ml. Yield : 36 g. (72 percent)

EXAMPLE 4

Seven hundred and twenty mg of tantalum-(V)-chloride are dissolved in 50 ml. of chlorobenzene and 50 g. of cyclopentene are added to the resulting solution. Following the addition of 4 ml. of a 1M solution of epichlorhydrin in chlorobenzene, the reaction mixture is cooled to 0°C. and reduced with 2.46 ml. of a 50 percent solution of ethyl aluminum dichloride. After 5 hours ' polymerization at 0°C. the polymer is worked up as described in Example 1. Yield : 36 g. (72 percent). Trans-double bond content : 80.4 percent.

EXAMPLE 5

The procedure is as in Example 4 except that only 3 ml. of a 1M epichlorhydrin solution are added. Yield : 47 g. (94 percent).

EXAMPLE 6

Three hundred and sixty mg. of $TaCl_5$ are dissolved in 50 ml. of chlorobenzene, and 18 g. of cyclopentene are added to the resulting solution which is cooled to −20°C. 0.16 ml. of water is added to the reaction mixture which, after some 5 minutes, is reduced with 2.4 ml. of a 50 percent solution of ethyl aluminum dichloride. Polymerization is continued for 1 hour at −20°C. The polymer is worked up as described in Example 1. Yield : 12 g. (77 percent).

EXAMPLE 7

Three hundred and ninety mg. of tantalum-(V)-chloride are dissolved in 50 ml. of chlorobenzene, 25 ml. of cyclopentene and then 185 mg. of $CuCl_2.2H_2O$ being added to the resulting solution which after 1 hour is cooled to −20°C. and reduced with 2.6 ml. of a 50 percent solution of ethyl aluminum dichloride. After 2 hours polymerization at −15°C., the polymer is worked up as described in
Example 1. Yield : 10 g. (55 percent).
Trans-double bond content : 85 percent.

EXAMPLE 8

The procedure is as described in Example 7, except that 175 mg. of $FeCl_3$ (subl.) are added instead of the $CuCl_2.2HB2O$. Yield : 9.5 g. (52 percent).
Trans-double bond content : 86 percent.

We claim:

1. A process for producing cyclopentene polymer which comprises contacting cyclopentene at a temperature from −60° to 60°C. with a catalyst comprising (a) a tantalum compound, (b) a halogen compound selected from the group consisting of allyl halide, 3-chlorocyclo-pentene, benzyl chloride, tert. alkyl halide, α-halogen ketone, α-halogen alcohol, α-halogen ether, halohydric acid and a salt of halohydric acid wherein "-halide" and "halogen" are chlorine, bromine and iodine and (c) an organoaluminum compound, the molar ratio of (a): (b): (c) being 1:0.3–10:0.5–15.

2. The process of claim 1 wherein said contacting is carried out in an inert solvent.

3. The process of claim 1 wherein (a) is tantalum halide or tantalum oxyhalide.

4. The process of claim 1 wherein (b) is allyl chloride, 3-chlorocyclopentene, benzyl chloride, tert. butyl chloride, tert. amyl chloride, α-chloroacetone, α-bromoacetone, α-chloroethanol, 1,3-dichloro-2-propanol, α-chlorocyclohexanol, α-chlorophenol, epichlorhydrin, epibromhydrin, α-chlorodiethylether, hydrogen chloride, ferric chloride, cupric chloride or hydrogen bromide.

5. The process of claim 1 wherein (c) is aluminum trialkyl, aluminum dialkylhalide or aluminum alkyldihalide.

6. A process for producing trans-polypentenamers having 80 to 95 percent trans-configuration which comprises adding, at a temperature of from −60 to 60°C., cyclopentene, a halogen compound selected from the group consisting of allyl halide, 3-chlorocyclopentene, benzyl chloride, tert. alkyl halide, α-halogen ketone, α-halogen alcohol, α-halogen ether, halohydric acid and a salt of halohydric acid wherein "-halide" and "halogen" are chlorine, bromine and iodine and an organo-aluminum compound to a solution of a tantalum chloride in an inert organic solvent and recovering resulting polymer.

7. A catalyst comprising (a) a tantalum compound, (b) a halogen compound selected from the group consisting of allyl halide, 3-chlorocyclo-pentene, benzyl chloride, tert. alkyl halide, α-halogen ketone, α-halogen alcohol, α-halogen ether, halohydric acid and a salt of halohydric acid wherein "halide" and "-halogen" are chlorine, bromine and iodine and (c) an organo-aluminum compound, the molar ratio of (a):(b):(c) being 1:0.3–10:0.5–15.

8. The catalyst of claim 7 wherein (a) is tantalum halide or tantalum oxyhalide.

9. The catalyst of claim 7 wherein (b) is allyl chloride, 3-chlorocyclopentene, benzyl chloride, tert. butyl chloride, tert. amyl chloride, α-chloroacetone, α-bromoacetone, α-chloroethanol, 1,3-dichloro-2propanol, α-chlorocyclohexanol, α-chlorophenol, epichlorhydrin, epibromhydrin, α-chlorodiethyl-ether, hydrogen chloride, ferric chloride, cupric chloride or hydrogen bromide.

10. The catalyst of claim 7 wherein (c) is aluminum trialkyl, aluminum dialkylhalide or aluminum alkyldihalide.

* * * * *